(12) United States Patent
Woodfield et al.

(10) Patent No.: US 8,211,388 B2
(45) Date of Patent: Jul. 3, 2012

(54) PREPARATION OF UNIFORM NANOPARTICLES OF ULTRA-HIGH PURITY METAL OXIDES, MIXED METAL OXIDES, METALS, AND METAL ALLOYS

(75) Inventors: Brian F. Woodfield, Provo, UT (US);
Shengfeng Liu, Provo, UT (US);
Juliana Boerio-Goates, Orem, UT (US);
Qingyuan Liu, Provo, UT (US); Stacey Janel Smith, Sandy, UT (US)

(73) Assignee: Brigham Young University, Provo, UT (US)

( * ) Notice: Subject to any disclaimer, the term of this patent is extended or adjusted under 35 U.S.C. 154(b) by 802 days.

(21) Appl. No.: 11/707,840

(22) Filed: Feb. 16, 2007

(65) Prior Publication Data

US 2008/0032132 A1 Feb. 7, 2008

Related U.S. Application Data

(60) Provisional application No. 60/774,990, filed on Feb. 16, 2006, provisional application No. 60/874,438, filed on Dec. 11, 2006.

(51) Int. Cl.
*B22F 9/16* (2006.01)
*C22B 61/00* (2006.01)

(52) U.S. Cl. ............. 423/1; 75/343; 75/392; 423/592.1; 423/659; 977/840; 977/896

(58) Field of Classification Search ............ 75/343, 75/392; 977/840, 896
See application file for complete search history.

(56) References Cited

U.S. PATENT DOCUMENTS

| 4,543,341 | A | 9/1985 | Barringer et al. |
| 5,128,081 | A | 7/1992 | Siegel et al. |
| 5,328,501 | A | 7/1994 | McCormick et al. |
| 5,358,695 | A | 10/1994 | Helble et al. |
| 5,417,956 | A | 5/1995 | Moser |
| 5,486,675 | A | 1/1996 | Taylor et al. |
| 5,698,483 | A | 12/1997 | Ong et al. |
| 5,876,683 | A | 3/1999 | Glumac et al. |
| 5,879,715 | A * | 3/1999 | Higgins et al. ............ 424/489 |
| 5,927,621 | A | 7/1999 | Ziolo et al. |

(Continued)

FOREIGN PATENT DOCUMENTS

AU 758256 3/2003

(Continued)

OTHER PUBLICATIONS

Matson, D. W et al., *Ultrafine Iron Oxide Powders generated using a flow-through hydrothermal process*, Mater. Lett. 1992, pp. 222-226, vol. 14, No. 4.

(Continued)

*Primary Examiner* — Hoa (Holly) Le
(74) *Attorney, Agent, or Firm* — Workman Nydegger

(57) ABSTRACT

In preferred embodiments, metal nanoparticles, mixed-metal (alloy) nanoparticles, metal oxide nanoparticles and mixed-metal oxide nanoparticles are provided. According to embodiments, the nanoparticles may possess narrow size distributions and high purities. In certain preferred embodiments, methods of preparing metal nanoparticles, mixed-metal nanoparticles, metal oxide nanoparticles and mixed-metal nanoparticles are provided. These methods may provide tight control of particle size, size distribution, and oxidation state. Other preferred embodiments relate to a precursor material that may be used to form nanoparticles. In addition, products prepared from such nanoparticles are disclosed.

27 Claims, 9 Drawing Sheets

U.S. PATENT DOCUMENTS

| | | | |
|---|---|---|---|
| 5,958,361 A | 9/1999 | Laine et al. | |
| 6,066,305 A | 5/2000 | Dugger | |
| 6,203,768 B1 | 3/2001 | McCormick et al. | |
| 6,468,497 B1 | 10/2002 | Khan et al. | |
| 6,503,475 B1 | 1/2003 | McCormick et al. | |
| 6,506,493 B1 | 1/2003 | Kumar et al. | |
| 6,600,127 B1 | 7/2003 | Peterson et al. | |
| 6,620,351 B2 | 9/2003 | Gupta et al. | |
| 6,749,648 B1 | 6/2004 | Kumar et al. | |
| 6,749,966 B2 | 6/2004 | Reitz et al. | |
| 6,777,639 B2 | 8/2004 | Schroder et al. | |
| 6,803,027 B1 | 10/2004 | Virkar et al. | |
| 6,962,946 B2 | 11/2005 | Brady et al. | |
| 7,049,347 B2 | 5/2006 | Hu | |
| 7,060,473 B2 | 6/2006 | Phelps et al. | |
| 7,066,977 B2 | 6/2006 | Huang | |
| 7,081,267 B2 | 7/2006 | Yadav | |
| 7,087,100 B2 | 8/2006 | Lewis et al. | |
| 7,105,145 B2 | 9/2006 | Seol et al. | |
| 7,118,727 B2 | 10/2006 | Williams | |
| 7,211,542 B2 * | 5/2007 | Baker et al. | 502/330 |
| 7,384,448 B2 * | 6/2008 | Johnson, Jr. | 75/333 |
| 2002/0110517 A1 | 8/2002 | James et al. | |
| 2002/0187889 A1 | 12/2002 | Lauf et al. | |
| 2003/0019328 A1 | 1/2003 | Dunmead et al. | |
| 2003/0032192 A1 | 2/2003 | Haubold et al. | |
| 2003/0051580 A1 | 3/2003 | Lewis et al. | |
| 2003/0102099 A1 | 6/2003 | Yadav et al. | |
| 2003/0124043 A1 | 7/2003 | Yadav et al. | |
| 2003/0126948 A1 | 7/2003 | Yadav et al. | |
| 2003/0138368 A1 | 7/2003 | Yadav et al. | |
| 2003/0180213 A1 | 9/2003 | Carnes et al. | |
| 2004/0005485 A1 | 1/2004 | Yadav et al. | |
| 2004/0009118 A1 | 1/2004 | Phillips et al. | |
| 2004/0086452 A1 | 5/2004 | Seol et al. | |
| 2004/0108220 A1 | 6/2004 | Stephan et al. | |
| 2004/0120884 A1 | 6/2004 | Sherman | |
| 2004/0178530 A1 | 9/2004 | Yadav | |
| 2004/0231464 A1 | 11/2004 | Kurihara et al. | |
| 2005/0031517 A1 | 2/2005 | Chan | |
| 2005/0053538 A1 | 3/2005 | Holloway et al. | |
| 2005/0063889 A9 | 3/2005 | Yadav et al. | |
| 2005/0063898 A1 | 3/2005 | Ja Chisholm | |
| 2005/0119398 A1 | 6/2005 | Zhang | |
| 2005/0191492 A1 | 9/2005 | Yadav | |
| 2005/0214916 A1 | 9/2005 | Absar et al. | |
| 2005/0228202 A1 | 10/2005 | Nappa et al. | |
| 2005/0260122 A1 | 11/2005 | Li et al. | |
| 2005/0271566 A1 | 12/2005 | Yadav | |
| 2006/0084278 A1 | 4/2006 | Winter et al. | |
| 2006/0115411 A1 | 6/2006 | Jensen et al. | |

FOREIGN PATENT DOCUMENTS

| | | |
|---|---|---|
| AU | 2005203123 A1 | 2/2006 |
| EP | 0 735 001 A2 | 10/1996 |
| JP | 2003-034526 A | 2/2003 |
| JP | 2003-267704 A | 9/2003 |
| JP | 2005-263615 A | 9/2005 |
| JP | 2005-336019 A | 12/2005 |
| WO | WO 00/24676 | 5/2000 |
| WO | WO 02/055240 A1 | 7/2002 |
| WO | WO 02/060623 A2 | 8/2002 |
| WO | WO 03/014011 A1 | 2/2003 |
| WO | WO 03/031323 A1 | 4/2003 |
| WO | WO 03/076338 | 9/2003 |
| WO | WO 2004/007357 A1 | 1/2004 |
| WO | WO 2004/092069 A3 | 10/2004 |
| WO | WO 2005/026045 A2 | 3/2005 |
| WO | WO 2005/060610 | 7/2005 |
| WO | WO 2005/077505 A2 | 8/2005 |
| WO | WO 2005/118465 A1 | 12/2005 |
| WO | WO 2006/000049 A1 | 1/2006 |

OTHER PUBLICATIONS

Kang, Y.C. et al, *Preparation of Nanometre size oxide particles using filter expansion aerosol generator*, Journal of Materials Science, 1996, pp. 2409-2416, vol. 31, No. 9.

Choy, H. et al., *Citrate Route to the Piezoelectroic Pb(Zr, Ti) O3 Oxide*, J. Mater Chem., 1997, pp. 1815-1820. vol. 7, No. 9.

Reverchon, E. et al, *Supercritical antisolvent precipitation of nanoparticles of superconductor precursors*, Industrial & Engineering Chemistry Research, 1998, pp. 952-958, vol. 37, No. 3.

Meulenkamp, E. A., *Synthesis and growth of ZnO nanoparticles*, Journal of Physical Chemistry B, Jul. 16, 1998, pp. 5566-5572. vol. 102, No. 29, ACS, USA.

Mizukoshi, Y. et al., *Preparation of platinum nanoparticles by sonochemical reduction of the Pt(II)ion*, Langmuir, pp. 2733-2737, Apr. 13, 1999, vol. 15, No. 8, American Chem. Soc., US.

Camargo, E. R. et al., *Pyrochlore-free Pb(Mg/sub 1/3/Nb/sub 2/3/)O/sub 3/ prepared by a combination of the partial oxalate and the polymerized complex methods*, Journal of Alloys and Compounds, Jan. 16, 2001, pp. 140-146, vol. 314, Elsevier, Switzerland.

Zhuang, Jia et al., *Study on nanophase cobalt oxide ($Co_3O_4$) fabrication by a solid-state reaction at ambient temperatures*, Journal of Inorganic Materials, pp. 1203-1206, vol. 16, No. 6, Nov. 2001.

Zhang, Feng et al., *Cerium oxide nanoparticles: Size-selective formation and structure analysis*, American Institute of Physics, Jan. 7, 2002, pp. 127-129.vol. 80, No. 1.

Hao, Chen et al., *The Technique for Preparing Nanometer $Al_2O_3$ Powder with Chemical Method*, Materials for mechanical engineering, Jul. 2002, pp. 25-27, vol. 26, No. 7.

Yang, Yang et al., *ZnO nanoparticles prepared by thermal decomposition of beta-cyclodextrin coated zinc acetate*, Chemical Physics Letters, May 13, 2003, pp. 22-27, vol. 373, No. 1-2, Elsevier, Netherlands.

Sun, Xudong et al. *Synthesis of Nanocrystalline $Al_2O_3$ Powders from Nanometric Ammonium Aluminum Carbonate Hydroxide*, Journal of the American Ceramic Society—Sun et al., 2003, pp. 1321-1325, vol. 86, No. 8.

Forsblom, T. et al, *Generation of metal and metal oxide nanoparticles by liquid flame spray process*, Journal of Materials Science, Apr. 15, 2004, pp. 2783-2788, vol. 39, No. 8.

Yuan, Fangli et al., *Preparation of zinc oxide nanoparticles coated with homogeneous $Al_2O_3$ layer*, Materials of Science and Engineering, Oct. 28, 2004, pp. 55-60.

Jha, R K et al., *Synthesis of Bismuth Oxide Nanoparticles using Bismuth Nitrate and Urea*, Ceramics International, 2005, pp. 495-497, vol. 31, No. 3, Elsevier Science Ltd., Oxford, UK.

Vale, Damaris et al., *Production of Nanoparticles of Aluminum Oxide by Decomposition of Aerosols of Aluminum Nitrate Solution in a Flame*, Transactions of the American Nuclear Society, 2005, pp. 352-353, vol. 92, American Nuclear Society, Inc., La Grange Park, IL, USA.

Patil, M M et al., *Synthesis of Bismuth Oxide Nanoparticles at 100 C*, Materials Letters, 2005, pp. 2523-2525, vol. 59, No. 19/20, Elsevier, BV, Amsterdam, Netherlands.

Tani, T. et al., *Effects of solvent on powder characteristics of zinc oxide and magnesia prepared by flame spray pyrolysis*, Nippon Seramikkusu Kyokai Gakujutsu Ronbunishi (Journal of Ceramic Society of Japan), 2005, pp. 255-258, vol. 113, No. 3, Nippon Seramikkusu Kyokai, Tokyo, Japan.

Niederberger, M. et al, *Non-aqueous routes to crystalline metal oxides nanoparticles: Formation mechanisms and applications*, Progress Solid State Chemistry, 2005, pp. 59-70, vol. 33, No. 2-4, Elsevier, UK.

Li, Feng et al., *One-step solid-state reaction synthesis and gas sensing property of tin oxide nanoparticles*, Sensors and Actuators B, Jan. 5, 2005, pp. 165-16, vol. 81, No. 2-3, Elsevier Sequoia S.A., Lausanne, CH.

Gao, Lisheng et al., *Optical and electrochemical properties of nanosized NiO via thermal decomposition of nickel oxalate nanofibres*, Nanotechnology, Jan. 2005, pp. 37-39, vol. 16, No. 1.

Chen, Yixian et al., *Preparation and characterization of palladium colloidal nanoparticles by thermal decomposition of palladium acetate with microwave irradiation*, Journal of Materials Science & Technology, Mar. 2005, pp. 187-190, vol. 21, No. 2, Editorial Board J. Mater. Sci. & Technol, China.

Dar, M A et al., *Preparation and characterization of alpha-FeOOH and alpha-Fe2O3 by sol-gel method*, Journal of Materials Science, Jun. 2005, pp. 3031-3034, vol. 40, No. 11, Kluwer, Norwell, MA, USA.

Harbrecht, Bernd et al., *Ferrimagnetic nanogranular Co/sub3/O/sub4/ through solovothermal decomposition of colloidally dispersed monolayers of a-cobalt hydroxide*, Journal of Physical Chemistry B, Jun. 16, 2005, pp. 11468-11472, vol. 109, No. 23.

Morales, J. et al., *Synthesis and characterization of nanometric iron and iron-titanium oxides by mechanical milling: electrochemical properties as anodic materials in lithium cells*, Journal of Electrochemical Society, Sep. 2005, pp. A1748-A1754, vol. 152, No. 9, Electrochem. Soc, USA.

Carja, G. et al., *From the organized nanoparticles of copper and vanadium containing LDHs to the small nanoparticles of mixed oxides: a simple route*, Mater. Lett (Netherlands), Oct. 2005, pp. 3078-3080, vol. 59, No. 24-25, Elsevier, Netherlands.

You-Cheng, Wu et al., *Synthesis of Al/sub 2/O/sub 3/ nanopowders by electrical explosion of wires*, High Power Laser and Particle Beams, Nov. 2005, pp. 1753-1756, vol. 17, No. 11, IEE, Nucl. Soc., China.

Muller, A. et al., *Polyol method for the preparation of nanosized Gd/sub 2/O/sub3/, boehmite and other oxides*, Materials Research Bulletin, Dec. 8, 2005, pp. 2153-2169, vol. 40, No. 12, Elsevier, USA.

Driess, Matthias et al., *Molecular encoding at the nanoscale: From complex cubes to bimetallic oxides*, Angewandte Chemie—International Edition, Dec. 9, 2005, pp. 7892-7896, vol. 44, No. 48.

Zhang, Maolin et al., *Novel preparation of nanosized ZnO-SnO/sub 2/ with high photocatalytic activity by homogeneous co-precipitation method*, Materials Letters, Dec. 2005, pp. 3641-3644, vol. 59, No. 28, Elsevier, Netherlands.

Callone, E. et al., *Nanopowders of metallic oxides prepared by the hydrolytic route with starch stabilization and biological abetment*, Journal of Nanoscience and Nanotechnology, Jan. 2006, pp. 254-257, vol. 6, No. 1, American Scientific Publishers, USA.

Lu, Mei et al., *Synthesis and characterization of Ca/sub3/Co/sub4/O/sub9/ nanoparticles by citrate sol-gel method*, Mater Lett, Sep. 2006, pp. 2443-2446, vol. 60, No. 20.

Huang, Yuqiang et al., *Cobalt nanoparticles synthesis from Co(CH/sub3/COO)/sub2 by thermal decomposition*, Journal of Magnetism and Magnetic Materials, Sep. 2006, pp. e28-e30, vol. 304, No. 1.

Vasylkiv, Oleg et al, *Nonisothermal synthesis of yttria-stabilized zirconia nanopowder through oxalate processing. I-Characteristics of Y-Zr oxalate synthesis and its decomposition*, American Ceramic Society, Sep. 2000, pp. 2196-2002, vol. 83, No. 9.

Cheang, P. et al, *RF induction plasma synthesized calcium phosphate nanoparticles*, Key Engineering Materials, vols. 309-311, May 2006, pp. 511-514, Trans Tech Publications, Switzerland.

Tsuzuki, Takuya et al., *ZnO Nanoparticles Synthesised by Mechanochemical Process*, Scripta Materialia, 2001, pp. 1731-1734, vol. 44, Nos. 8/9.

Lin Y. et al., *Preparation of Nanometer Zinc Oxide Powders by Plasma Pyrolysis Technology and Their Applications*, J. Am Ceram. Soc., vol. 83 (11) 2869-71 (2000).

Wang, J. et al., *Synthesis and characterization of ZnO nanoparticles assembled in one-dimensional order*, Inorganic Chemistry Communications, vol. 6 877-881 (2003).

Li, Z., et al., *Non-isothermal kinetics studies on the thermal decomposition of zinc hydroxide carbonate*, Thermochimica Acta, vol. 438, 102-106 (2005).

Sun, Ya-Ping et al., *Preparation of Nickel, Cobalt, and Iron Nanoparticles Through the Rapid Expansion of Supercritical Fluid Solutions, (RESS) and Chemical Reduction*, Chemistry of Materials, Jan. 1999, pp. 7-9, vol. 11, No. 1, American Chemical Society, Washington, US.

Li, Feng. et al, *One-step solid-state reaction synthesis and gas sensing property of tin oxide nanoparticles*, Sensors and Actuators B, Jan. 2002, pp. 165-169, vol. 81, No. 2-3, Elsevier.

Zhijian, Wang, et al, *Low-temperature synthesis of ZnO nanoparticles by solid-stae pyrolytic reaction*, Nanotechnology, Jan. 1, 2003, pp. 11-15, vol. 14, No. 1, IOP, Bristol, GB.

Liu, Yan-Li et al, *Simple synthesis of MgFe2O4 nanoparticles and gas sensing materials*, Sensors and Actuators B, Jun. 29, 2005, pp. 600-604, vol. 107, No. 2, Elsevier.

Wostek-Wojciechowska, Dorota, et al., *The solid-state synthesis of metal nanoparticles from organometallic precursors*, Journal of Colloid and Interface Science, Jul. 1, 2005, pp. 107-113, vol. 287, No. 1, Academic Press, New York, NY, USA.

PCT Application No. PCT/US2007/004279, International Search Report and the Written Opinion of the International Searching Authority, Mailed Sep. 11, 2007.

Lin, et al. "Characterisation of ZnO-based Varistors Prepared from Nanometre Precursor Powders", Advanced Materials for Optics and Electronics, Adv. Mater. Opt. Electron. 9, pp. 205-209 (1999).

* cited by examiner

PREPARATION OF UNIFORM NANOPARTICLES OF ULTRA-HIGH PURITY METAL OXIDES, MIXED METAL OXIDES, METALS, AND METAL ALLOYS

CROSS-REFERENCE TO RELATED APPLICATIONS

This application claims priority from U.S. Provisional Application No. 60/774,990, filed Feb. 16, 2006, and U.S. Provisional Application No. 60/874,438, filed Dec. 11, 2006.

STATEMENT REGARDING FEDERALLY SPONSORED R&D

This invention was made with government support under contract # DE-FG02-OSER15666 awarded by the Department of Energy. The government has certain rights in the invention.

BACKGROUND OF THE INVENTION

1. Field of the Invention

The invention relates to metal and metal oxide nanoparticles, methods of preparing metal and metal oxide nanoparticles, compounds that may be used in the preparation of metal and metal oxide nanoparticles, and products made from these nanoparticles.

2. Description of the Related Art

The synthesis, characterization, and exploitation of nanometer-sized materials are active fields. The exploration of the properties and uses for metals and metal oxides at the nanoscale is underway in a variety of disciplines, such as chemistry, physics, material science, and engineering. There exists a need in the art for a more economical and efficient method of producing a variety of nanoparticles of uniform size, novel composition, and high-purity. Also needed are reliable metal, mixed-metal (alloy), metal oxide and mixed-metal oxide nanoparticles with improved characteristics and properties for use in diverse applicants.

SUMMARY OF THE INVENTION

In preferred embodiments, metal nanoparticles, mixed-metal (alloy) nanoparticles, metal oxide nanoparticles and/or mixed-metal oxide nanoparticles are provided. According to embodiments, the nanoparticles may, but are not required to, possess one or more of the following properties: a pre-determined average particle size, an average particle size of about 1 nm to about 100 nm, a narrow size distribution, a size distribution within about 1% to about 15% of the average particle size, a pre-determined size distribution, substantially uniform oxidation state, high purities, a pre-determined oxidation state, a pre-determined stoichiometry, and a relatively uniform chemical composition. In certain preferred embodiments, methods of preparing metal nanoparticles, mixed-metal nanoparticles, metal oxide nanoparticles and mixed-metal nanoparticles are provided. Other preferred embodiments relate to a precursor material that may be used to form nanoparticles. In some embodiments, the precursor material may comprise a complex mixture comprising a metal hydroxide and a salt compound. The term, "complex mixture", refers to an interaction among components in a mixture beyond the interactions present in a simple physical mixture. In addition, products prepared from such nanoparticles are disclosed.

DETAILED DESCRIPTION OF THE PREFERRED EMBODIMENTS

Figure 1:
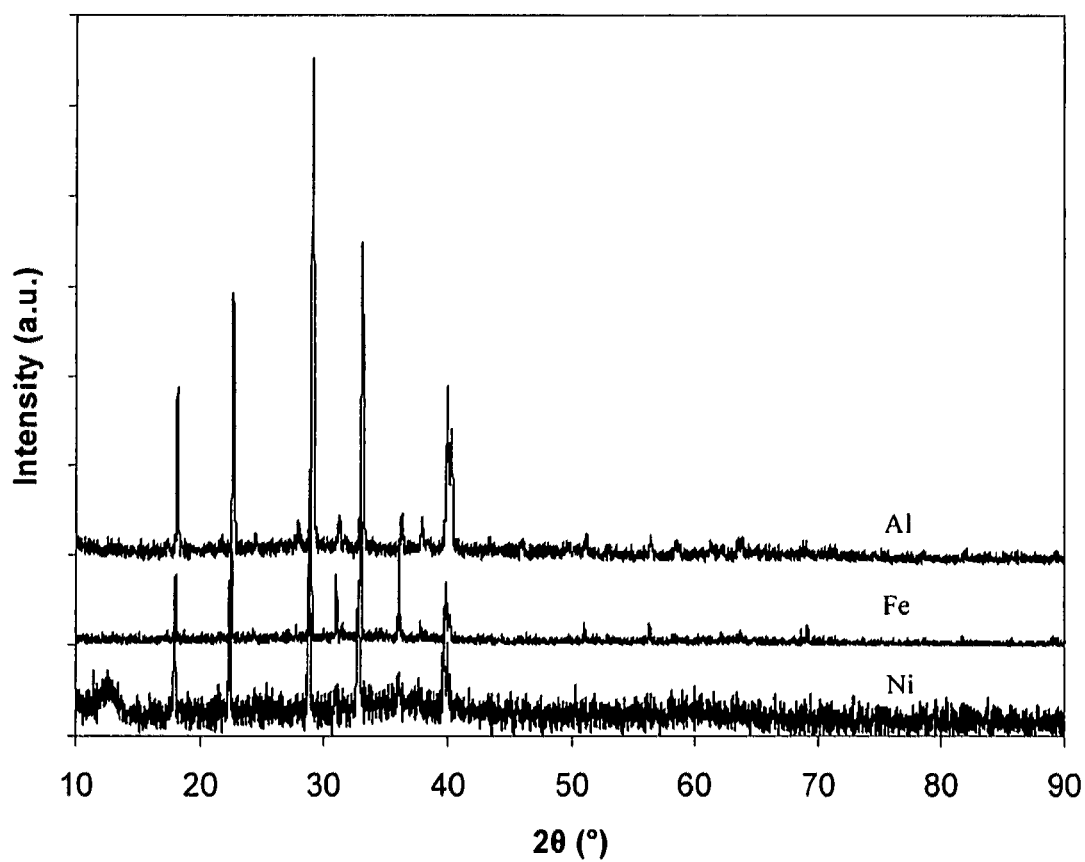
FIG. 1 is an X-Ray Diffraction (XRD) pattern of samples of the precursor material formed from mixing ammonium bicarbonate with aluminum nitrate, iron nitrate, and nickel nitrate, respectively.

The following description and examples illustrate the preferred embodiments of the present invention in detail. Those of skill in the art may recognize that there are numerous variations and modifications of this invention that are encompassed by its scope. Accordingly, the description of the preferred embodiments should not be deemed to limit the scope of the present invention.

Embodiments relate, in very general terms and without limitation, to a novel, simple method of producing large quantities of nanometer metal and metal oxide powders with ultra-high purities and with tight control of the particle size as well as tight control of particle size distribution and metal oxidation state. This method can be adapted to an extensive variety and combination of metals and provides a commercially viable approach to the large-scale production of metal and metal oxide nanoparticles. The nanoparticles formed thereby can be effectively used in a variety of applications such as catalysts, abrasion and radiation protective coatings, batteries, ceramics, electronic and electro-optical devices, fuel cells, supermagnets, photographic suspension, and the like. Embodiments also relate to a precursor material that may be used to produce metal and metal oxide nanoparticles of high purity, tight control of particle size, tight control of particle size distribution, and tight control of metal oxidation state. The precursor material may be stable and may be adapted to a variety of production conditions.

As used herein, the term "nanoparticle" is a broad term and is used in its ordinary sense, including, without limitation, a particle of matter reasonably measurable on the nanometer scale, including, but not limited to, a particle measuring between about 1 nm to about 100 nm in diameter. Nanoparticle may refer to a particle of matter in any particular solid or semi-solid form, including, but not limited to, crystalline and amorphous solid forms.

As used herein, the term "metal" is a broad term and is used in its ordinary sense, including, without limitation, metals, metalloids, transition metals, lanthanides and actinides. Specifically, as used herein, metal means any element of the Periodic Table except for Carbon, Nitrogen, Phosphorus, Oxygen, Sulfur, Fluorine, Chlorine, Bromine, Iodine, Hydrogen, Helium, Neon, Argon, Krypton, Xenon and Radon. As used herein, metals may include metals and metalloids in any oxidation state and of any purity.

Certain preferred embodiments relate to metal nanoparticles that may be used in various industrial applications. The metal nanoparticles may be single metal nanoparticles. Examples include, but are not limited to, beryllium, magnesium, aluminum, scandium, titanium, vanadium, chromium, manganese, iron, cobalt, nickel, copper, zinc, gallium, germanium, yttrium, zirconium, niobium, molybdenum, technetium, ruthenium, rhodium, palladium, silver, cadmium, indium, tin, antimony, lanthanum, cerium, praseodymium, neodymium, promethium, samarium, europium, gadolinium, terbium, dysprosium, holmium, erbium, thulium, ytterbium, lutetium, hafnium, tellurium, tantalum, tungsten, rhenium, osmium, iridium, platinum, gold, thallium, lead, bismuth, polonium, thorium, protactinium, uranium, neptunium, and plutonium nanoparticles.

In addition, certain embodiments relate to metal and metal oxide nanoparticles in various oxidation states. Different oxidation states of the metals may be 0, +1, +2, +3, +4, +5, +6, +7, and +8. The nanoparticles may also comprise an oxide such as beryllium oxide, magnesium oxide, aluminum oxide, scandium oxide, titanium oxide, vanadium oxide, chromium oxide, manganese oxide, iron oxide, cobalt oxide, nickel oxide, copper oxide, zinc oxide, gallium oxide, germanium oxide, yttrium oxide, zirconium oxide, niobium oxide, molybdenum oxide, technetium oxide, ruthenium oxide, rhodium oxide, palladium oxide, silver oxide, cadmium oxide, indium oxide, tin oxide, tellurium oxide, antimony oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide, hafnium oxide, tantalum oxide, tungsten oxide, rhenium oxide, osmium oxide, iridium oxide, platinum oxide, gold oxide, thallium oxide, lead oxide, bismuth oxide, polonium oxide, thorium oxide, protactinium oxide, uranium oxide, neptunium oxide, and plutonium oxide.

Some embodiments of the metal nanoparticles comprise alloys or mixed-metal nanoparticles comprising a combination of any of the foregoing metals or metal oxides. In still other embodiments, the nanoparticles comprise mixed-metal oxide nanoparticles comprising a mixture of any of the foregoing metal compounds. Examples of mixed-metal and mixed-metal oxide nanoparticles include, but are not limited to, nickel iron oxide, zinc cobalt iron oxide, lithium zinc nickel iron oxide, lithium cobalt oxide, zinc cadmium oxide, aluminum zinc oxide, copper indium selenium, copper selenium, vanadium tin oxide, tin uranium vanadium nickel oxide, vanadium antimony oxide, antimony tin oxide, vanadium antimony tungsten oxide, bismuth strontium calcium copper oxide, uranium barium copper oxide, bismuth strontium calcium copper, led bismuth, cadmium tellurium, cadmium selenium tellurium oxide, copper bismuth oxide, strontium titanium oxide, calcium titanium oxide, lanthanum aluminum oxide, and mixtures thereof.

In certain embodiments, the nanoparticles may measure about 1, 2, 5, 10, 15, 20, 25, 30, 35, 40, 45, 50, 55, 60, 65, 70, 75, 80, 85, 90, 95, or 100 nm in diameter. In addition, the nanoparticles may range in size from about any of the foregoing amounts to about any of the other foregoing amounts, including, but not limited to, about 1-100 nm, about 5-80 nm, 5-30 nm, and 10-40 nm. In certain preferred embodiments, the nanoparticles measure about 1-100 nm.

The purity of the nanoparticles is not particularly limited. The nanoparticles may comprise purely the metal, metal oxide, mixed-metal, or mixed-metal oxide nanoparticles or may comprise additional materials. The metal, mixed-metal, metal oxide, or mixed-metal oxide nanoparticles may comprise about 1%, 5%, 10%, 20%, 30%, 40%, 50%, 60%, 70%, 80%, 85%, 90%, 91%, 92%, 93%, 94%, 95%, 96%, 97%, 98%, 99%, 99.9%, 99.99%, 99.999%, 99.9999%, 99.99999%, 99.999999% or 100% of a sample comprising the nanoparticles. In certain preferred embodiments, the nanoparticles comprise about 90% to about 100% of the sample. In other embodiments, the nanoparticles comprise about 99% to about 99.999999% of the sample. In still other embodiments, the nanoparticles comprise about 95% to about 99.999% of the sample.

Further, the normal size distribution of the metal nanoparticles of a sample of nanoparticles may comprise about 0.1%, 1%, 2%, 3%, 4%, 5%, 6%, 7%, 8%, 9%, 10%, 11%, 12%, 13%, 14%, 15%, 18%, 20%, 23%, 25%, 30%, 35%, 40%, 45%, 50%, 55%, 60%, 65%, 75%, 85%, or 95% of the average particle size of a sample. In addition, the normal size distribution of the nanoparticles may comprise an amount in the range of about any of the foregoing percentages to about any of the other foregoing percentages, including, but not limited to 0.1-15%, 1-8%, 2-12%, and 5-10% of the average particle size. In other embodiments, one standard deviation of the size distribution would be a number less than about 15 nm. In other embodiments, one standard deviation of the size distribution would be a number in the range from about 3 nm to about 10 nm.

In addition, the metal, mixed-metal, metal oxide, and mixed-metal oxide nanoparticles in a sample may comprise various oxidation states or may substantially compromise the same oxidation state.

The nanoparticles may be present in a crystalline form or an amorphous form according to embodiments.

Certain preferred embodiments relate to a method of producing metal, metal oxide, mixed-metal, and mixed-metal oxide nanoparticles. The method may comprise the steps of providing starting materials, mixing the starting materials to form a precursor material and heating the precursor material sufficient to form nanoparticles. The starting materials may be provided in any order. The starting materials may be provided at the same time or may be provided sequentially. Please note that this description is not intended to limit the sequence of the steps in the method. For example, the starting materials may be provided, mixed and then heated. Alternatively, the starting materials may be heated and then mixed. In addition, the steps may be repeated in any combination as well. For example, the starting materials may be heated, mixed, and then heated again. Alternatively, the starting materials may be mixed, heated, and then mixed again. In addition, the starting materials may be mixed, heated, mixed again, and then heated another time. The sequence is not limited thereby.

In certain embodiments, the starting materials comprise a metal salt, or mixtures thereof, and a base, or mixtures thereof.

The anion of the metal salt may comprise organic anions, inorganic anions, and mixtures thereof. Examples of organic anions include, but are not limited to, acetate, oxalate and citrate. Examples of inorganic anions include, but are not limited to, nitrate, chloride, sulfate and phosphate.

The metal of the metal salt may be any metal and may comprise an oxidation state of +1, +2, +3, +4, +5, +6, +7, or +8. The metal salt may be in an anhydrous form or it may be in a hydrated form. In addition, the metal salt may be in a crystalline form or it may be in an amorphous form. In addition, in some embodiments, the starting materials can comprise a mixture of metal salts.

Examples of metals salts include, but are not limited to, cobalt nitrate, cobalt oxalate, cobalt acetate, cobalt citrate, cobalt chloride, nickel nitrate, nickel sulfate, nickel oxalate, nickel acetate, copper nitrate, copper sulfate, copper oxalate, copper acetate, copper citrate, copper chloride, zinc nitrate, zinc phosphate, zinc oxalate, zinc acetate, zinc chloride, aluminum nitrate, aluminum acetate, aluminum citrate, aluminum chloride, aluminum oxalate, iron nitrate, iron oxalate, iron acetate, iron chloride, iron nitrate, iron oxalate, iron acetate, iron chloride, yttrium nitrate, yttrium acetate, yttrium chloride, yttrium citrate, neodymium nitrate, neodymium acetate, neodymium chloride, neodymium citrate, silver nitrate, silver acetate, silver phosphate, silver oxalate, silver chloride, tin nitrate, tin citrate, tin oxalate, tin chloride, lithium nitrate, lithium acetate, lithium chloride, lithium citrate, zirconium chloride, zirconium nitrate, zirconium citrate, zirconium oxalate, manganese nitrate, manganese chloride, manganese oxalate manganese phosphate, indium nitrate, indium chloride, indium acetate, indium citrate, indium oxalate, antimony nitrate, antimony phosphate, antimony acetate, cerium chloride, cerium citrate, gold nitrate, gold acetate, gold sulfate, gold chloride, iridium nitrate, iridium acetate, iridium oxalate, iridium chloride, magnesium nitrate, magnesium chloride, magnesium citrate, magnesium acetate, and mixtures thereof.

The base may comprise a compound that, when mixed with the metal salt, leads to the partial or complete hydrolysis of the metal salt and provides counter-cations for the anion of the metal salt. The base may be in a solid form or it may be in a liquid form. Examples of the base include, but are not limited to, ammonium carbonate, ammonium bicarbonate, ammonium sesquicarbonate, ammonium chloride, ammonium oxalate, ammonium sulfate, ammonium hydroxide, ammonium nitrate, lithium hydroxide, sodium hydroxide, potassium hydroxide, magnesium hydroxide, calcium hydroxide, and mixtures thereof.

The metal salt and the base may be provided in various amounts and molar ratios. In addition, where the starting materials comprise a mixture of two or more metal salts, the metal salts may be provided in various amounts and molar ratios. According to certain embodiments, the molar ratio of the metal salt to base is not particularly limited. For example, the molar ratio of the metal salt to base may be about 0.01, 0.1, 0.5, 1, 1.5, 2, 2.5, 3, 3.5, 4, 4.5, 5, 6, 7, 8, 9 or 10. In addition, the molar ratio of the metal salt to base can comprise a number in the range of about any of the foregoing numbers to about any of the other foregoing numbers, including, but not limited to, 0.01-5, 1-4, 2-6, and 1-3.

In certain embodiments, the starting materials are mixed sufficiently to form a precursor material. As used herein, the term "precursor material" is a broad term used to describe, without limitation, the material formed when energy, including mechanical energy, or force is added to the starting materials during mixing sufficient to cause intimate contact of the starting materials to induce a reaction in the starting materials. The term "precursor material" can be used to describe, without limitation, the material formed after mixing the starting materials for any amount of time, at any temperature, in any type of atmosphere (oxidative, reductive, or inert), and with any amount of force or energy sufficient to induce a reaction in at least a portion of the starting materials. The precursor material may comprise starting materials that have been completely or partially converted, altered, decomposed, or reacted. Evidence that a reaction occurs after adding energy to the starting materials can be seen in XRD and TGA analysis of the starting materials before and after adding energy to the mixture.

Although not intending to be bound by theory, the inventors posit that, as the mixing of the starting materials to form the precursor material proceeds, the metal of the metal salt is hydrolyzed and the anion of the metal salt is partially or completely displaced by hydroxyl groups to form crystalline or amorphous metal hydroxides. The oxidation state of the metal may remain the same value during the hydrolysis and the mixing. In addition, the oxidation state of the metal may increase or decrease depending on the conditions of the mixing. During mixing, the base partially or completely decomposes or disassociates, and the anion of the metal salt is replaced by a hydroxide group. The anion of the metal salt and the cation of the base may bond to form crystalline or amorphous salts.

Figure 2:
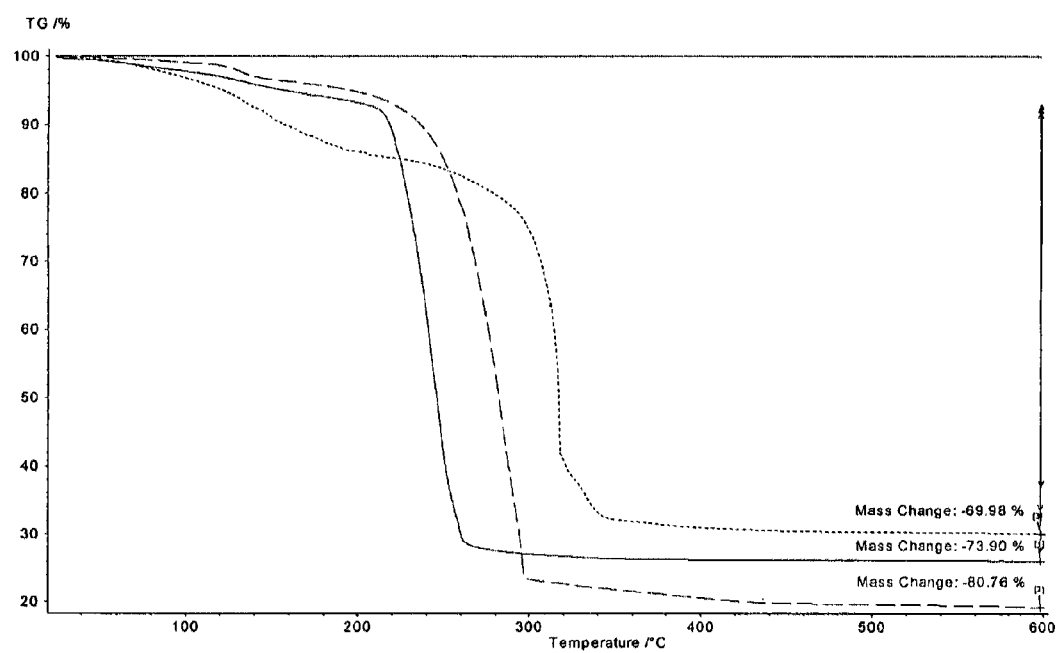
FIG. 2 depicts Thermogravimetric Analysis (TGA) curves taken from samples of the precursor material formed from mixing ammonium bicarbonate with aluminum nitrate, iron nitrate, and nickel nitrate, respectively.
Figure 3:
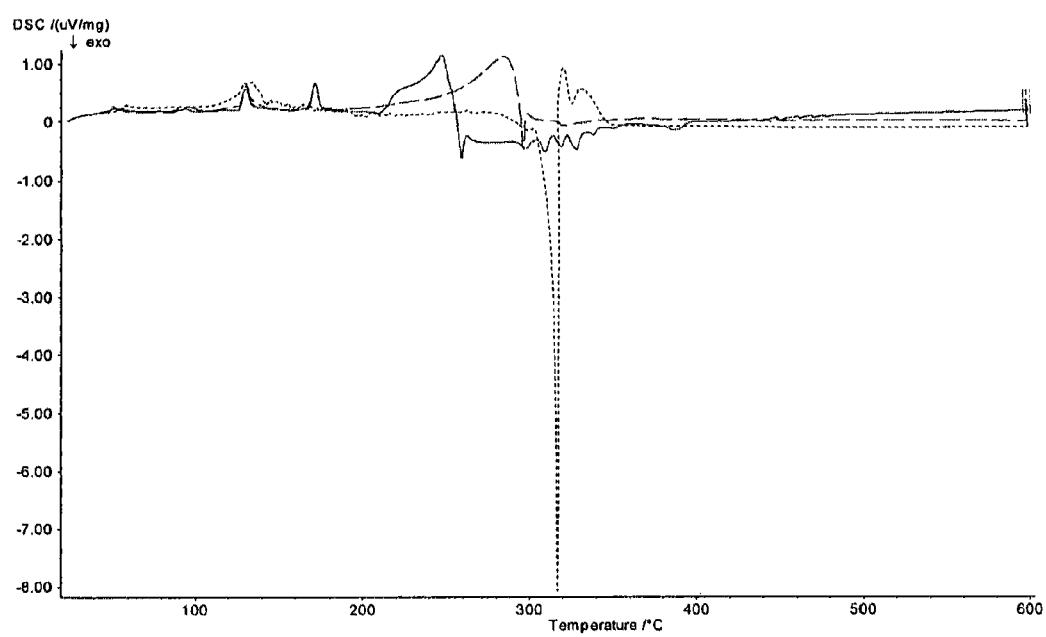
FIG. 3 depicts Differential Scanning Calorimetry (DSC) curves taken from samples of the precursor material formed from mixing ammonium bicarbonate with aluminum nitrate, iron nitrate, and nickel nitrate, respectively.

Although not intending to be bound by theory, the inventors posit that as the mixing proceeds, the metal hydroxide compounds form a complex mixture with the salts that have formed comprising the anions of the metal salt and the cation of the base. For example, in embodiments where aluminum nitrate and ammonium bicarbonate are used as starting materials, amorphous aluminum hydroxide formed during mixing forms a complex mixture with ammonium nitrate salt compounds in the precursor material. Also, in another non-limiting example, embodiments where iron nitrate and ammonium bicarbonate are used as starting materials, amorphous iron hydroxide formed during mixing forms a complex mixture with ammonium nitrate salt compounds in the precursor material. Finally, in another non-limiting example, embodiments where nickel nitrate hydrate and ammonium bicarbonate are used as starting materials, amorphous nickel hydroxide formed during mixing complexes with ammonium nitrate salt compounds in the precursor material. FIG. 1 depicts XRD diffraction patterns taken from samples of the precursor material formed from mixing ammonium bicarbonate with aluminum nitrate, iron nitrate, and nickel nitrate, respectively. The diffraction patterns are each consistent with the presence of crystalline ammonium nitrate. The XRD data confirms that crystalline ammonium nitrate is formed during mixing. The absence of peaks corresponding to the diffraction pattern of aluminum, iron and nickel hydroxides indicates that amorphous metal hydroxides are formed. Finally, FIGS. 2 and 3 depict TGA and DSC curves of samples of the precursor material formed from mixing ammonium bicarbonate with aluminum nitrate, iron nitrate, and nickel nitrate, respectively. The difference in the final endothermic decomposition temperature of the ammonium nitrate among the three samples indicates a complex mixture has formed between the amorphous hydroxide and ammonium nitrate. The salt interacts with each of the individual metal hydroxides in a unique manner.

In some embodiments, the metal salt and the base are mixed in the solid state, substantially free of solvent and solvent molecules. In some embodiments, the metal salt ions and the base ions are not solvated, but interact directly and replace each other directly. In some embodiments, solvent molecules may be present during mixing but not in sufficient concentrations to completely solvate the metal salt and base ions. In still other embodiments, solvent molecules may be present sufficient to solvate the ions and form a solution comprising the metal salt and the base during mixing.

As the mixing proceeds, the precursor material may become gelatinous or semi-solid. In particular, in embodiments comprising hydrated metal salts, the waters of hydration may be liberated and the precursor material may soften. Water may be added during mixing to increase the effectiveness of the mixing and to assist in ensuring reaction completion. For example, if the starting materials comprise 5 g of metal salt and 5 g of base, about 1, 2, 5, 10, 15, 20, 25, 30, 40, 50, 60, 70, 80, 90, 100, 125, 150, 175 or 200 ml of water may be added prior to or during mixing. In addition, an amount of water in the range from about any of the foregoing numbers to about any of the other foregoing numbers may be added to the mixture prior to or during mixing, including, but not limited to, 1-10 ml, 5-15 ml and 3-10 ml of water.

In some embodiments, the color of the precursor material may change as mixing proceeds. For example, the color of the precursor material comprising cobalt nitrate and ammonium bicarbonate as starting materials may change from red to black as the mixing proceeds. In embodiments comprising ammonium bicarbonate as the base, carbon dioxide gas may evolve as the mixing proceeds.

The temperature of the precursor material as the mixing proceeds is not particularly limited and may vary during the process of mixing. In certain preferred embodiments, the mixing is conducted at room temperature (e.g., 20° C. to 30° C.). However, in some embodiments, the mixing takes place at a temperature slightly or substantially below room temperature. Also, in some embodiments, the mixing is conducted at temperatures slightly or substantially higher than room temperature.

The duration of the mixing is not particularly limited. In some embodiments, the mixing may proceed until substantially all of the metal salt has been converted to metal hydroxide. This amount of time will vary depending on, among other things, the metal salt used, the base used, the amount of water added prior to or during mixing, and the amount of force or energy introduced into the mixture system during mixing. The conversion from metal salt to metal hydroxide may be monitored via TGA and/or XRD. In addition, the rate at which the metal salt is converted to the metal hydroxide will depend upon, among other factors, the metal salt used, the base used, the amount of water added prior to or during mixing, and the amount of force or energy introduced into the mixture system during mixing.

During mixing, the particle size of the starting materials and the precursor materials may be reduced due to various factors. The factors that may influence the particle size of the materials during mixing include, but are not limited to, the force or energy applied to the mixing system during mixing, the length of time of mixing, and the temperature of the mixture during mixing.

Optionally, the precursor material may be mixed two or more times. The various mixing procedures may be conducted under similar or different conditions.

The method of mixing is not particularly limited. Examples include, but are not limited to, mortar and pestle grinding, ball milling, roller milling, or counter rotator mixing.

Similarly, the amount of energy or force introduced into the mixing system is not particularly limited and can vary during the mixing process. In some embodiments such as mixing and grinding using a mortar and pestle, the amount of energy varies and cannot be specifically quantified. In other embodiments, the amount of energy introduced during mixing can be tightly controlled to control the formation of the precursor and control the formation of nanoparticles after mixing. For example, through the use of a ball mill, a roller mill, or a counter rotator, the amount of energy or force introduced into the mixing system and applied to the starting materials can be more controlled.

In certain embodiments, the precursor material comprising the metal hydroxide(s) may be dried to remove any excess water. The drying may be conducted at about 30, 35, 45, 50, 55, 60, 65, 70, 75, 80, 85, 90, 95, 100, 105, 110, 115 or 120° C. In addition, the drying may be conducted at a temperature in a range from about any of the foregoing values to about any of the other foregoing values, including, but not limited to, 70-100, 80-95, and 85-100° C. In embodiments where the precursor material is dried, the drying may be conducted for various lengths of time including, but not limited to, about 1, 5, 12, 24, 48, 72, 96, 120, 144, 168, 192, 216, 240, 500, 750, 1000, 1500, 2000, or 2500 hours. In addition, the drying may be conducted for an amount of time in a range from about any of the foregoing amounts to about any of the other foregoing amounts, including, but not limited to, 1-24, 2-20, and 5-8 hours. After drying, the precursor material may be agglomerated. The agglomerated precursor material may be ground, sonicated or subjected to some other treatment in order to separate and disperse the particles of the precursor material.

The precursor material is stable in certain preferred embodiments. As mentioned above, the precursor material may be dried. The precursor material may be ground to separate the particles or to reduce the size of the precursor material particles. The precursor material may be stored for extended periods of time. The precursor material may be stored in air or under an inert atmosphere.

In certain embodiments, the precursor material comprising the metal hydroxide(s) may be heated. As the heating proceeds, the metal hydroxide(s) of the precursor material partially or completely dehydrate to form metal, metal oxide, mixed-metal, or mixed-metal oxide nanoparticles and the other salts of the precursor material decompose. In some embodiments, the salts may decompose to release gaseous products. For example, oxalate, citrate and acetate may partially or completely decompose to produce carbon dioxide and water; chlorides may partially or completely decompose to form chlorine gas, ammonium may partially or completely decompose to form ammonia gas; and nitrate may partially or completely decompose to form nitrous oxide and water. In other embodiments, the salts may partially decompose and partially remain in the sample comprising the nanoparticles.

The heating may be conducted under various conditions including various heating rates, dwell temperatures, dwell times, and cooling rates. In addition, the heating may be conducted under a combination of two or more heating rates, dwell temperatures and/or dwell times.

The heating rate is not particularly limited and may comprise a heating rate of about 0.1, 0.5, 1, 2, 3, 4, 5, 6, 7, 8, 9, 10, 12, 15, 17, 20, 22, 25, 27, 30, 32, 35, or 40° C. per minute. In addition, the heating rate may comprise a rate in the range from about any of the foregoing values to any of the other foregoing values, including, but not limited to, 5-30, 10-40, and 20-30° C. per minute.

The dwell temperature is not particularly limited and may comprise a dwell temperature of about 150, 175, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, or 750° C. In addition, the dwell temperature may comprise a temperature in the range of about any of the foregoing values to any of the other foregoing values, including, but not limited to, 250-750, 300-650, 275-675, 300-400, 300-550, 400-600, and 300-600° C.

The dwell time is not particularly limited and may comprise a dwell time of about 1, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 450, 500, 550, or 600 minutes. In addition, the dwell time may comprise a length of time in the range from about any of the foregoing values to about any of the other foregoing values, including, but not limited to 100-600, 180-300, 200-400, and 350-500 minutes.

In certain preferred embodiments, the heating process may comprise an initial heating rate, a dwell temperature and a dwell time. Further, in certain preferred embodiments, the initial heating rate comprises about 5° C. to about 20° C. per minute, the final dwell temperature comprises a temperature of about 300° C. to about 600° C., and the dwell time comprises about 30 to about 90 minutes. In certain industrial applications such as fuel cells, it may be beneficial to select metal salts that may be used at a higher dwell temperature. The selection of metal salt and base and the production of the nanoparticles can be tailored to the application.

The size of the resulting nanoparticles may vary depending on, among other factors, the starting materials used, the molar ratio of the metal salt to base, the duration of mixing, the amount of metal hydroxide(s) formed during mixing, the heating rate, the dwell temperature and the dwell time. For example, in embodiments comprising the same starting materials, nanoparticles formed after a longer mixing time or a more complete reaction to form metal hydroxide(s) during mixing and heating may be smaller than nanoparticles formed after a shorter mixing time and/or a less complete reaction to form metal hydroxide(s) during mixing and heating. In addition, in another non-limiting example, in embodiments comprising the same starting materials, mixing conditions and heating conditions, nanoparticles formed from starting materials comprising a larger base to metal salt ratio may be smaller than nanoparticles formed from starting materials comprising a smaller base to metal salt ratio. In addition, in another non-limiting example, in embodiments comprising the same starting materials, nanoparticles formed during a less rapid heating rate or a lower dwell temperature may be smaller than nanoparticles formed during a more rapid heating rate or a higher dwell temperature. Also, in embodiments comprising the same starting materials, nanoparticles formed during a shorter dwell time may be smaller than nanoparticles formed during a longer dwell time.

In addition, the shape of the resulting nanoparticles may vary depending on, among other factors, the type of metal being used and the reaction conditions. In certain embodiments, spherical nanoparticles are formed. However, as exemplified by the yttrium oxide particles formed in Example 26, the nanoparticles formed may be cylindrical or rod-shaped. The formation of rod-shaped nanoparticles indicates that the above-described method permits crystals to grow and form thermodynamically stable conformations.

In certain embodiments, the heating may be conducted under an oxidative, inert, or reductive atmosphere. An oxidative atmosphere may comprise an atmosphere comprising oxidative reagents such as oxygen. A reductive atmosphere may comprise an atmosphere comprising reductive reagents such as hydrogen gas. An inert atmosphere may comprise an atmosphere substantially free from oxidative reagents and reductive agents. For example, an inert atmosphere may comprise argon, helium, or nitrogen gas.

In addition, the heating may be conducted under a combination of one or more such atmospheres. For example, the heating may take place for a certain period of time under an inert atmosphere, and, for a certain period of time, under a reductive atmosphere. Also, in some embodiments, the heating may take place for a certain period of time under an oxidative atmosphere, and, for a certain period of time, under a reductive atmosphere. Please note that these examples are meant for illustrative purposes only and are not exhaustive of the possible combinations and/or variations.

The oxidation state of the resulting nanoparticles may be controlled through the practice of heating under an oxidative, inert, or reductive atmosphere. For example, heating the precursor material under an oxygen atmosphere may be used to yield high oxidation state metal oxide nanoparticles. Similarly, heating the precursor material under a hydrogen atmosphere may be used to yield metal nanoparticles in a zero oxidation state. Finally, heating the precursor material under an inert atmosphere may be used to maintain the oxidation state of the starting metal salts.

The oxidation state of the resulting nanoparticles may be substantially uniform. For example, if the heating of the precursor material is conducted under a reductive atmosphere, all or substantially all of the nanoparticles formed may be in the zero oxidation state. Similarly, if the heating of the precursor material is conducted under an inert atmosphere, all or substantially all of the metals of the metal oxide nanoparticles may be in the same oxidation state as the starting materials. Please note that this description is merely for illustrative and descriptive purposes and not intended the limit the scope of the invention in any way. There may be several other factors such as starting materials and mixing conditions that may affect the oxidation state of the resulting nanoparticles.

In addition, according to some embodiments, the resulting nanoparticles can comprise a mixed oxidation state material.

The size distribution of the resulting nanoparticles may be substantially uniform. For example, heating the precursor material may result in the formation of nanoparticles wherein the normal size distribution of the nanoparticles comprises about 0.1%, 1%, 2%, 3%, 4%, 5%, 6%, 7%, 8%, 9%, 10%, 11%, 12%, 13%, 14%, 15%, 18%, 20%, 23%, 25%, 30%, 35%, 40%, 45% or 50% of the average particle size of the sample. The extent of uniformity may depend on several factors including, but not limited to, the extent to which the metal hydroxide(s) is (are) formed from the metal salts during mixing, the heating rate and the dwell temperature. In some embodiments, one standard deviation of the particle size distribution is a number that is less than about 15 nm. In other embodiments, one standard deviation of the particle size distribution is a number in the range of about 3 nm to about 10 nm, or about 2 nm to about 6 nm.

In certain preferred embodiments, the crystal phase of the resulting metal, metal oxide, mixed-metal, and mixed-metal oxide nanoparticles may be substantially uniform. For example, in some embodiments, the resulting particles are substantially of a single phase. The phase purity of the resulting nanoparticles may depend on several factors, including, but not limited to, the atmosphere under which the heating is conducted (oxidative, reductive, or inert), and the base used.

The purity of the nanoparticles is not particularly limited. The collection may comprise purely the nanoparticles or may comprise additional materials. The metal, mixed-metal, metal oxide, or mixed-metal oxide nanoparticles may comprise about 1%, 5%, 10%, 20%, 30%, 40%, 50%, 60%, 70%, 80%, 85%, 90%, 91%, 92%, 93%, 94%, 95%, 96%, 97%, 98%, 99%, 99.9%, 99.99%, 99.999%, 99.9999%, 99.99999%, 99.999999% or 100% of the sample. In certain preferred embodiments, the nanoparticles comprise about 98-100, 98-99, 98-99.999, 99.99-99.99999 and 98-100% of the sample. The purity of the resulting nanoparticle sample may depend, among other factors, on the purity of the starting materials.

The morphology (shape) of the nanoparticles may be substantially uniform.

In embodiments comprising the formation of alloys or mixed-metal nanoparticles and mixed-metal oxide nanoparticles, the stoichiometry of the mixed-metal and mixed-metal oxide nanoparticles may vary depending on, among other factors, the molar ratio of the various metal salts in the starting materials. In general, the stoichiometry of the resulting mixed-metal or mixed-metal oxide nanoparticles will follow the molar ratios of the metal salts of the starting materials in embodiments where other factors are constant. For example, if the starting materials comprise a molar ratio of a first metal salt to a second metal salt of 1:1, the stoichiometry of all or substantially all of the resulting mixed-metal or mixed-metal oxide nanoparticles formed after mixing and heating may be 1:1. Also, if the starting materials comprise a molar ratio of a first metal salt to a second metal salt to a third metal salt of 1:1:2, the stoichiometry of all or substantially all of the resulting mixed-metal or mixed-metal oxide nanoparticles formed after mixing and heating may be 1:1:2. Thus, a very precise metal stoichiometric ratio can be achieved. Please note that this description is merely for illustrative and descriptive purposes and not intended the limit the scope of the invention in any way. There may be several other factors that may affect the stoichiometry of the resulting mixed-metal nanoparticles.

EXAMPLES

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

Example 1

20 grams of cobalt nitrate ($Co(NO_3)_2 \cdot 6H_2O$) were mixed with 6.2 grams ammonium bicarbonate. As the mixing process proceeded, a solid state reaction occurred changing the appearance of the precursor material from red to black. The mixture was mixed using a mortar and pestle for about 25 minutes, forming the precursor material. Next, the precursor was dried at 80° C. for about 6.5 hours and then heated at 300° C. for two hours under an argon atmosphere. The resulting product was 8 nm cobalt oxide. The purity of the cobalt oxide product was measured by ICP and found to have no detectable impurities down to the ppm level.

Example 2

Figure 6:
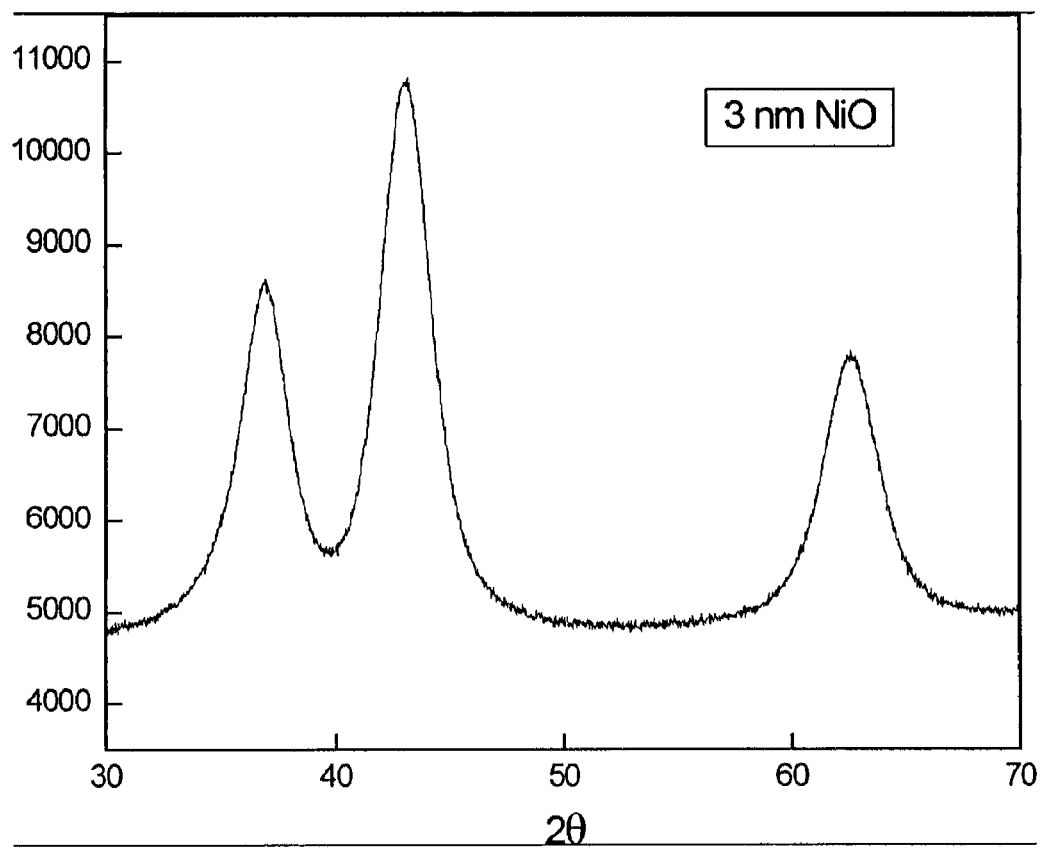
FIG. 6 is an XRD pattern taken of a sample of the nickel oxide (NiO) nanoparticles formed after heating precursor material at 300° C. for one hour in air according to Example 2.
Figure 7:
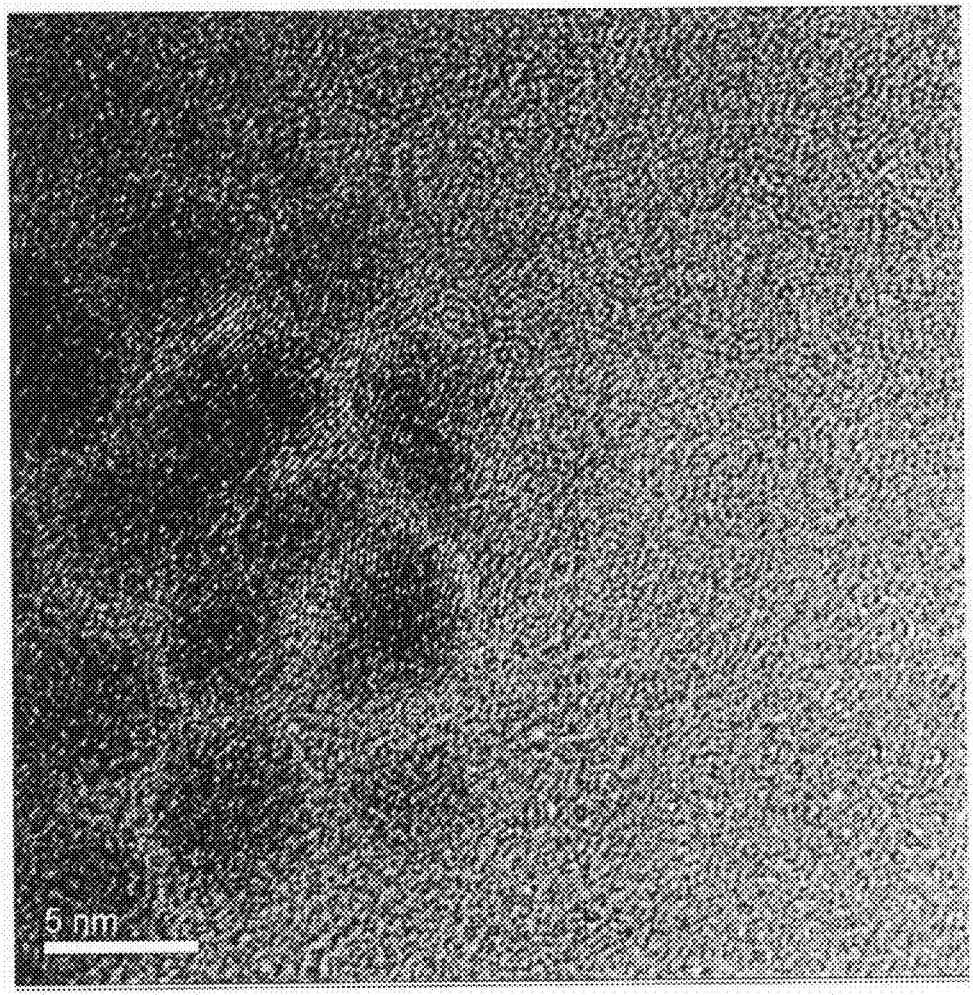
FIG. 7 is a TEM image taken of a sample of the nickel oxide nanoparticles formed in Example 2.

Example 1 was repeated except that 20 grams of nickel nitrate ($Ni(NO_3)_2 \cdot 6H_2O$) were used instead of the 20 grams of cobalt nitrate and 8.1 grams of ammonium bicarbonate were used instead of 6.2 grams. The precursor material was divided into two portions. One portion was heated at 300° C. for one hour in air and the other portion was heated at 400° C. for one hour in air. The portions yielded 3 nm and 9 nm nickel oxide, respectively. A TEM image and an XRD pattern of the 3 nm nickel oxide are shown in FIGS. 6 and 7, respectively.

Example 3

Example 1 was repeated except that 20 grams copper nitrate ($Cu(NO_3)_2 \cdot 2.5H_2O$) and 7.7 grams of ammonium bicarbonate were used. The precursor material was heated at 300° C. for one hour in air yielding 8 nm copper oxide (CuO).

Example 4

Example 1 was repeated except that 20 grams zinc nitrate ($Zn(NO_3)_2 \cdot 6H_2O$) were used instead of the 20 gram cobalt nitrate and 7.9 grams of ammonium bicarbonate were used. The precursor material was divided into two portions. One portion was heated at 300° C. for 90 minutes in air and the other portion was heated at 400° C. for 90 minutes in air yielding 8 nm and 16 nm zinc oxide (ZnO), respectively.

Example 5

Example 1 was repeated except that 20 grams aluminum nitrate ($Al(NO_3)_3 \cdot 9H_2O$) were used instead of the 20 gram of cobalt nitrate and 13 grams ammonium bicarbonate were used. The precursor material was divided into two portions. One portion was heated at 300° C. for one hour in air and the other portion was heated at 450° C. for one hour in air yielding 2 nm and 8 nm aluminum oxide ($Al_2O_3$), respectively.

Example 6

Figure 8:
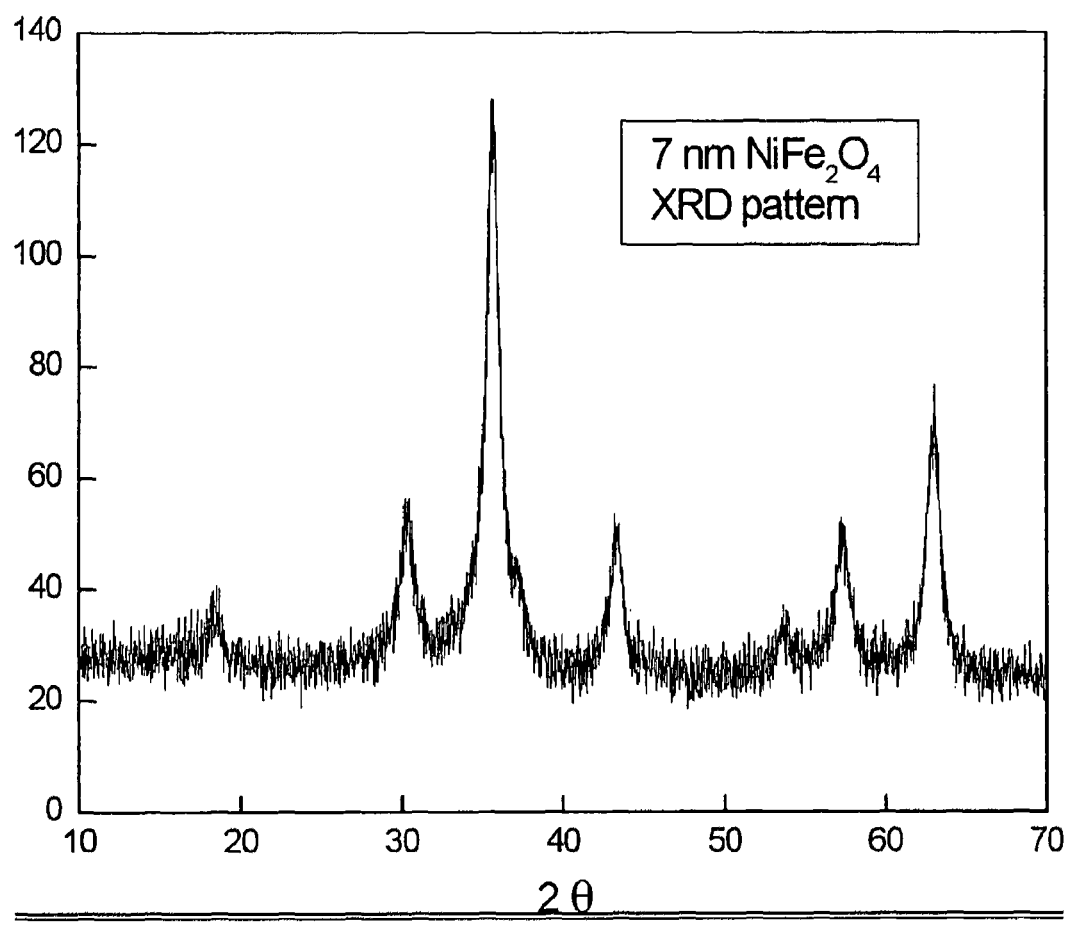
FIG. 8 is an XRD pattern taken of a sample of the nickel iron oxide ($NiFe_2O_4$) nanoparticles formed in Example 6.
Figure 9:
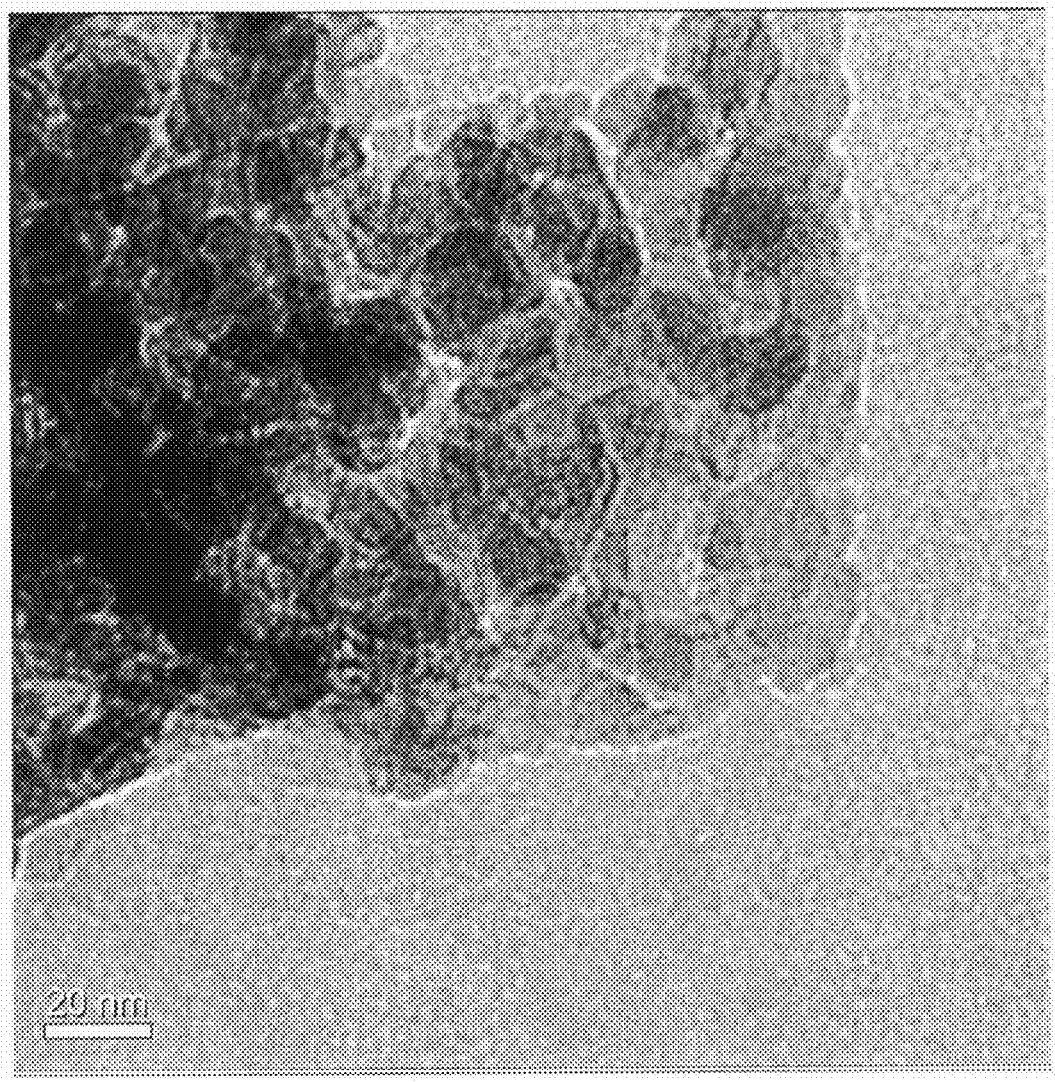
FIG. 9 is a TEM image taken of a sample of the nickel iron oxide nanoparticles formed in Example 6.

Example 1 was repeated except that the starting materials were 30 grams iron nitrate ($Fe(NO_3)_2 \cdot 9H_2O$), 10.8 grams nickel nitrate ($Ni(NO_3)_2 \cdot 6H_2O$), and 14.1 grams ammonium bicarbonate were used. The precursor material was divided into two portions. One portion was heated at 300° C. for 90 minutes in air and the other portion was heated at 500° C. in air yielding nickel iron oxide ($NiFe_2O_4$) crystals measuring less than 1 nm and 7 nm, respectively. An XRD pattern and a TEM image of the 7 nm nickel iron oxide nanoparticles is shown in FIGS. 8 and 9, respectively.

Example 7

Example 1 was repeated except that the starting materials were 30 grams iron nitrate ($Fe(NO_3)_2 \cdot 9H_2O$), 4.6 grams ($Zn(NO_3)_2 \cdot 6H_2O$), 6.72 grams cobalt nitrate ($Co(NO_3)_2 \cdot 6H_2O$), and 25 grams ammonium bicarbonate. The precursor material was heated at 400° C. for one hour in air yielding about 8 nm crystalline zinc cobalt iron oxide ($Zn_{0.4}Co_{0.4}Fe_2O_4$).

Example 8

Example 1 was repeated except that the starting materials were 30 grams iron nitrate ($Fe(NO_3)_2 \cdot 9H_2O$), 3.80 grams ($Zn(NO_3)_2 \cdot 6H_2O$), 4.02 nickel nitrate ($Ni(NO_3)_2 \cdot 6H_2O$), 0.36 grams lithium nitrate ($LiNO_3$), and 22 grams ammonium bicarbonate were used. The precursor material was dried and heated at 450° C. for one hour in air yielding 8 nm crystalline lithium zinc nickel iron oxide ($Li_{0.15}Zn_{0.3}Ni_{0.4}Fe_{2.15}O_4$).

Example 9

Example 1 was repeated except that 20 grams yttrium nitrate ($Y(NO_3)_3 \cdot 6H_2O$) and 14 grams of ammonium bicarbonate were used as starting materials. The precursor material was dried and dived into two portions. One portion was heated at 400° C. for one hour in air and the other portion was heated at 500° C. for one hour in air yielding 1 nm and 13 nm yttrium oxide ($Y_2O_3$), respectively.

Example 10

Example 1 was repeated except that 20 grams neodymium nitrate ($Nd(NO_3)_3 \cdot 6H_2O$) and 15 grams ammonium bicarbonate were used as starting materials. The precursor material was dried and then heated at 500° C. for one hour in air yielding 9 nm neodymium oxide ($Nd_2O_3$).

Example 11

Example 1 was repeated except that 5 grams silver nitrate ($AgNO_3$) and 6 grams ammonium bicarbonate were used as starting materials. The precursor material was dried and then heated at 250° C. for one hour in air yielding 67 nm silver oxide ($Ag_2O$).

Example 12

Example 2 was repeated except that the dried precursor material was heated at 450° C. for two hours in a hydrogen atmosphere yielding 40 nm nickel metal nanoparticles.

Example 13

Example 1 was repeated except that the dried precursor material was heated at 300° C. for two hours and four hours, respectively, under an argon atmosphere. The product was 8 nm and 10 nm cobalt oxide, respectively.

Example 14

5 grams of tin oxalate ($Sn(C_2H_3O_2)_2$) were combined with 3.4 grams of ammonium bicarbonate in an alumina mortar and mixed for approximately 15 minutes, forming the precursor material. As the mixing proceeded, the mixture became wet and formed a gel. After mixing, the precursor material was placed in an oven at 85° C. for 24 hours and dried. 2.72 grams of the dried precursor material were yielded. The dried precursor material was spread in an alumina combustion boat and heated at 300° C. for one hour with a ramp rate of 20° C. per minute. 2.5 grams of tin oxide ($SnO_2$) product were obtained and analyzed. The average diameter of the resulting nanoparticles was 4 nm. The purity of the nanoparticles was determined using Inductively Coupled Plasma (ICP) analysis. The tin oxide sample was determined to contain less than 0.5% carbon, less than 0.5% hydrogen, and less than 0.5% nitrogen. No detectable levels of chorine, lead, iron, sulfate were observed. Thus, the tin oxide samples was greater than 98.5% pure. The impurities appear to be due to water and carbon dioxide adsorbed to the surface of the nanoparticles rather than an integral part of the nanoparticles.

Example 15

0.59 grams lithium nitrate ($LiNO_3$) and 2.11 grams of cobalt oxalate ($Co(C_2H_3O_2)_2.4H_2O$) were combined with 2.0 grams of ammonium bicarbonate. The mixture was mixed in an alumina mortar and pestle forming the precursor material. The precursor material became wet and formed a pasty mass or a thick slurry. The slurry was mixed for more than 20 minutes until no more gas evolved. The precursor material was then dried in an oven at 85° C. for 24 hours. The dried precursor material was then baked at 400° C. for two hours. Lithium cobalt oxide ($LiCoO_2$) was produced; the average diameter of the resulting nanoparticles was 15 nm.

Example 16

3.6619 grams nickel oxalate hydrate ($NiC_2O_4.2H_2O$) and 3.1653 grams ammonium bicarbonate (ammonium:oxalate ratio of 2:1) were combined in a mortar and 5.0 ml of water was added to the mixture. The mixture was mixed with a pestle for 10 minutes forming the precursor material. The resulting precursor material was placed in an oven preheated to 90° C. and dried for 24 hours. The dried precursor material was ground into a fine powder. The dried precursor material was then placed in a box furnace that was programmed to heat from 25-300° C. in 30 minutes and to hold at this temperature for one hour. The final product was a black powder consisting of nickel oxide with an average particle size of 6.5 nm.

Example 17

The experiment of Example 16 was repeated, except the molar ratio of ammonium:oxalate was changed to 5:2 (3.9559 grams ammonium bicarbonate and 3.6650 grams nickel oxalate hydrate). The final size of the product particle was reduced to 5.3 nm.

Example 18

6.9928 grams of zirconium chloride ($ZrCl_4$), 0.9994 grams yttrium nitrate hydrate ($Y(NO_3)_3.6H_2O$), and 12.6360 grams ammonium bicarbonate were mixed in a mortar with a pestle forming the precursor material. 10 ml ethanol was added during the mixing. The mixing was continued with occasional water addition until bubbling ceased. The total water addition was 12 ml. The precursor material was dried at 90° C. for 24 hours. The dried precursor material was heated at 550° C. for one hour. 7 nm yttrium-stabilized zirconia particles were formed.

Example 19

3.6970 grams aluminum nitrate were mixed with 1.8 ml ammonium hydroxide (18 M). The mixture was mixed for ten minutes forming the precursor material. The precursor material was dried at 80° C. for eight days. The dried precursor material was then heated at 300° C. for two hours in air, yielding 15 nm aluminum oxide ($Al_2O_3$).

Example 20

4.6549 grams copper nitrate hydrate ($Cu(NO_3)_2.2.5H_2O$) were mixed in a mortar for five minutes. 3.9566 grams ammonium bicarbonate was then added. The mixture was then mixed for five minutes followed by the addition of 5 ml $H_2O$ and then another seven minutes of mixing. The precursor material was then dried at 90° C. for 24 hours. The precursor material was placed in a tube furnace. The furnace was flushed with pure $H_2$ for one hour at a flow rate higher than 200 ml/min. The precursor material was then heated from 30° C. to 450° C. at 10° C. per minute and cooked at this temperature for two hours with a constant $H_2$ flow of 90 ml/min. The sample was removed from the furnace and cooled to 30° C. Copper particles of 47 nm were formed.

Example 21

5.9763 grams iron citrate ($C_6H_5FeO_7.3H_2O$), 6.3248 grams ammonium bicarbonate, 5 ml $H_2O$ were mixed in a mortar until bubbling ceased. The precursor material was then dried at 90° C. for 24 hours. The dried precursor material was heated at 500° C. for one hour. Iron oxide ($Fe_2O_3$) with a particle size of 36 nm was formed.

Example 22

3.9234 grams manganese chloride were mixed with 3.2199 grams ammonium bicarbonate. 0.5 ml distilled water were added during mixing. Mixing proceeded for ten minutes forming the precursor material. The precursor material was then dried at 80° C. for 48 hours. The dried precursor material was then heated at 350° C. for two hours in air, yielding pale pink, 59 nm manganese oxide. XRD analysis shows that the most prominent oxidation state is $Mn_5O_8$, but there are peaks characteristic of other oxidation states present as well.

Example 23

Various amounts of nickel nitrate hydrate ($Ni(NO_3)_2 \cdot 6H_2O$), cobalt nitrate hydrate ($Co(NO_3)_2 \cdot 6H_2O$), and ammonium bicarbonate were mixed in a mortar. In one sample 5.815 gram nickel nitrate hydrate was mixed with 3.9543 gram ammonium bicarbonate. In a second sample, 4.6547 gram nickel nitrate hydrate, 1.1639 gram cobalt nitrate hydrate, and 3.9529 gram ammonium bicarbonate were mixed in a mortar. In a third sample, 2.9076 gram nickel nitrate hydrate, 2.9100 cobalt nitrate hydrate, and 3.9543 gram ammonium bicarbonate were mixed in a mortar. In a fourth sample, 1.1635 gram nickel nitrate hydrate, 4.6556 gram cobalt nitrate hydrate, and 3.9545 gram ammonium bicarbonate were mixed in a mortar. In a fifth sample, 5.9220 gram cobalt nitrate hydrate and 3.9524 gram ammonium bicarbonate were mixed in a mortar. 5 ml of water were added during the mixing of each sample. Each of the resulting precursor materials was dried at 90° C. for 24 hours. The dried samples were then placed in a tube furnace. The furnace was flushed with pure $H_2$ for one hour at a flow rate higher than 200 ml/min. The precursor materials were then heated from 30° C. to 450° C. at 10° C./min and cooked at this temperature for two hours with a constant $H_2$ flow of 90 ml/min. Each of the samples was taken out after the furnace was cooled down to 30° C. Sample 1 resulted in pure nickel metal nanoparticles measuring 16 nm. Sample 2 resulted in nickel cobalt mixed metal nanoparticles comprising 80% nickel and 20% cobalt and measuring 40 nm. Sample 3 resulted in nickel cobalt mixed metal nanoparticles comprising 50% nickel and 50% cobalt, and measuring 70 nm. Sample 4 resulted in nickel cobalt mixed metal nanoparticles comprising 20% nickel and 80% cobalt, and measuring 64 nm. Finally, Sample 5 resulted in pure cobalt metal nanoparticles measuring 50 nm.

Example 24

5.5460 grams nickel citrate hydrate ($Ni_3(C_6H_5O_7)_2 \cdot H_2O$), 6.3248 grams ammonium bicarbonate, 5 ml $H_2O$ were mixed in a mortar until bubbling ceased forming the precursor material. The precursor material was dried at 90° C. for 24 hours. The dried precursor material was heated at 500° C. for one hour. Nickel oxide (NiO) nanoparticles measuring 8 nm was formed.

Example 25

5.818 grams nickel nitrate were mixed with 2 ml ammonium hydroxide (18 M). The mixture was mixed for ten minutes forming the precursor material. The precursor material was then dried at 110° C. for 24 days. The dried precursor material was then heated at 300° C. for two hours in air, yielding 22 nm nickel oxide (NiO).

Example 26

Figure 4:
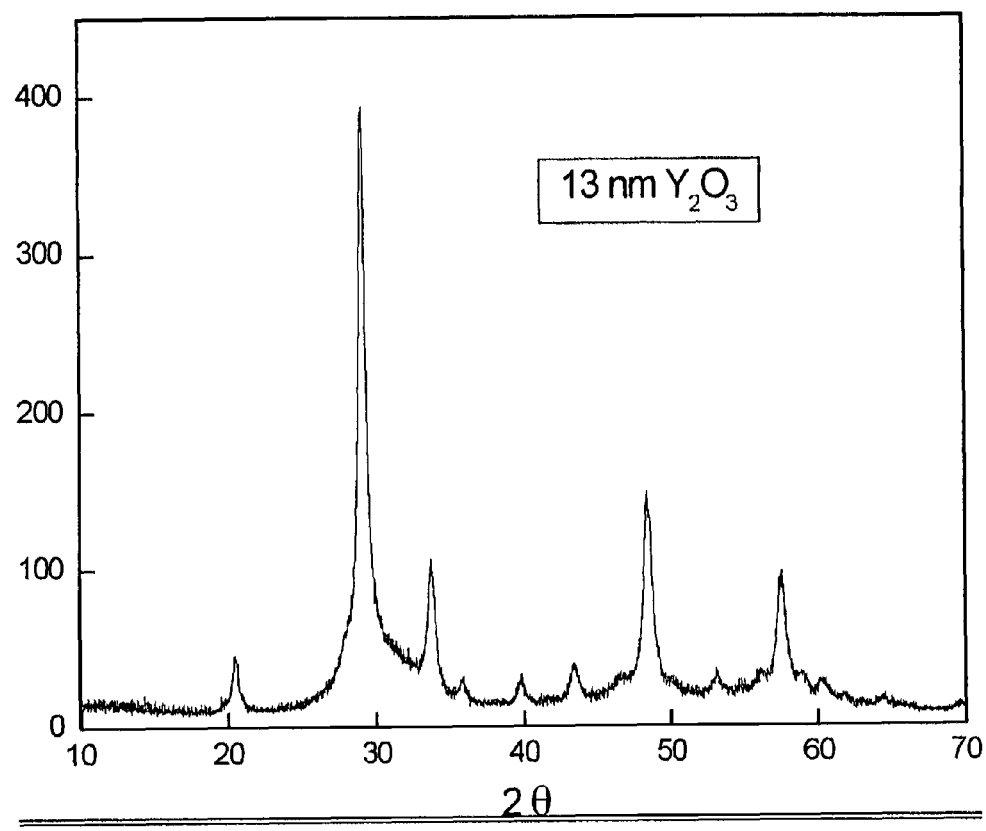
FIG. 4 is an XRD pattern taken of a sample of the yttrium oxide ($Y_2O_3$) nanoparticles formed in Example 26.
Figure 5:
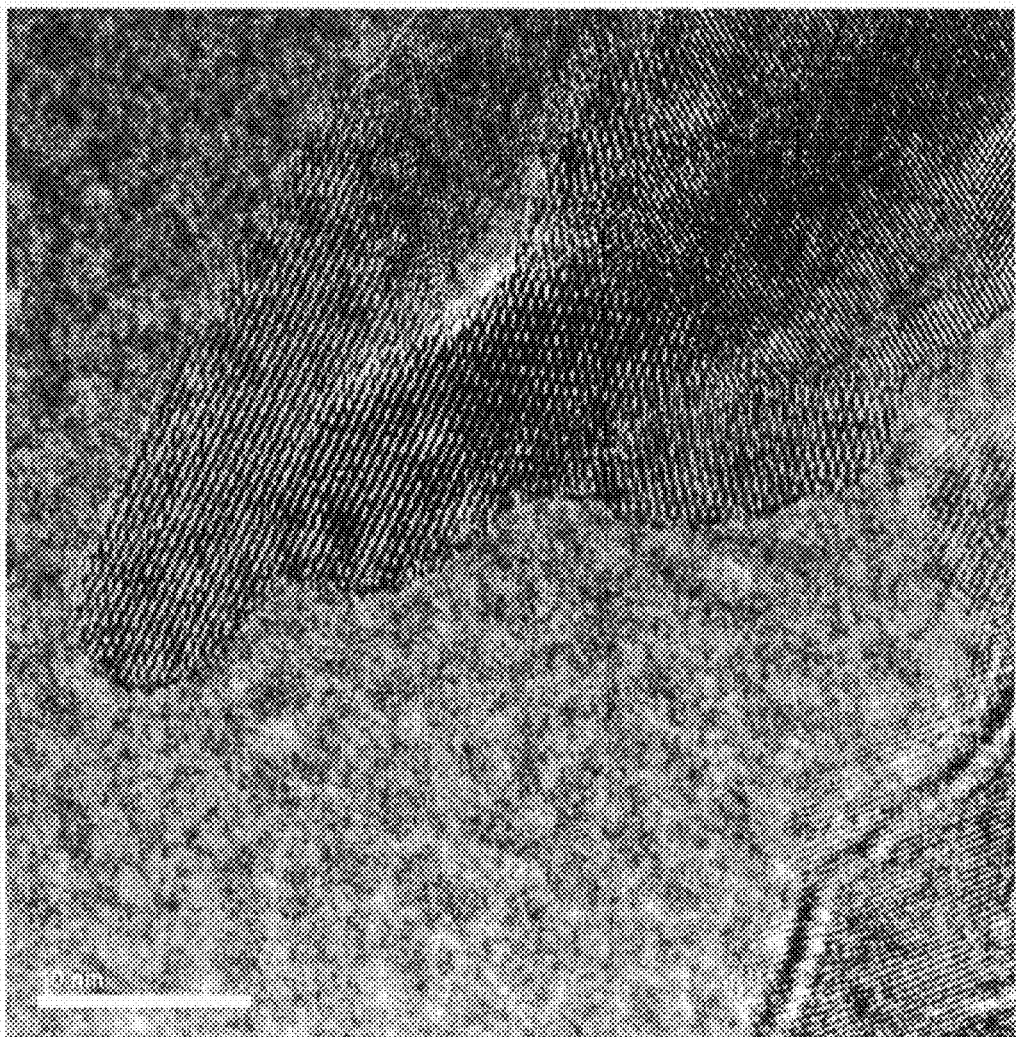
FIG. 5 is a Transmission Electron Microscopy (TEM) image taken of a sample of the yttrium oxide nanoparticles formed in Example 26.

6.265 grams yttrium nitrate were mixed with 4.05 grams ammonium bicarbonate. The mixture was mixed for one hour using a mortar and pestle. The precursor material was then dried at 80° C. for four weeks. The dried precursor material was then heated at 450° C. for 2 hours in air, yielding 11 nm yttrium oxide ($Y_2O_3$). An XRD pattern and a TEM image of a sample of the yttrium oxide are shown in FIGS. 4 and 5, respectively.

Example 27

10.0248 grams yttrium nitrate were mixed with 6.6234 grams ammonium bicarbonate. The mixture was mixed for 30 minutes in a mortar and pestle forming the precursor material. The precursor material was then dried at 80° C. for 24 hours. The dried precursor material was then heated at 400° C. for one hour in air, yielding 82 nm yttrium oxide.

Example 28

5.818 grams nickel nitrate were mixed with 3.162 grams ammonium bicarbonate. The mixture was mixed for ten minutes using a mortar and pestle forming the precursor material. The precursor material was then dried at 80° C. for 24 hours. The dried precursor material was divided into two portions. One portion was heated at 290° C. for 30 minutes, ramped up to 300° C. in ten minutes, then held at 300° C. for 90 minutes, yielding 17 nm nickel oxide. The other portion was heated at 280° C. for 30 minutes, ramped up to 300° C. in ten minutes, then held at 300° C. for 90 minutes, yielding 26 nm nickel oxide.

Example 29

5.5 ml titanium chloride ($TiCl_4$) were mixed with 15.8183 grams ammonium bicarbonate and ground in a mortar under a flame hood. The mixture was mixed in the mortar until bubbling ceased forming the precursor material. 15 ml of water was added during the mixing. The precursor material was then dried in an oven at 90° C. for 24 hours. The dried precursor material was heated at 350° C. for one hour. 7 nm titanium oxide ($TiO_2$) particles were obtained. The purity of the sample was determined using ICP analysis. The titanium oxide sample was determined to comprise less than 0.5% carbon, less than 0.5% hydrogen, less than 0.5% nitrogen, and 0.47% chlorine. No detectable levels of lead, iron, and sulfur were observed. Thus, the titanium oxide was greater than 98% pure. The impurities appear to be due to water and carbon dioxide adsorbed on the surface of the particles rather than an integral part of the nanoparticles.

Example 30

2.6683 grams zinc chloride were mixed with 3.1551 grams ammonium bicarbonate. 1 ml distilled water was added during mixing. The mixture was mixed for 10 minutes using a mortar and pestle forming the precursor material. The precursor material was dried at 80° C. for 48 hours. The dried precursor material was then heated at 350° C. for two hours in air, yielding 15 nm zinc oxide (ZnO).

Example 31

2.39989 grams zirconium chloride was mixed with 3.1379 grams ammonium bicarbonate. 4 ml distilled water were added during mixing. The mixture was mixed for ten minutes using a mortar and pestle forming the precursor material. The precursor material was then dried at 80° C. for 48 hours. The dried precursor material was then heated at 350° C. for two hours in air, yielding 5 nm zirconium oxide ($ZrO_2$).

Example 32

20 grams aluminum nitrate were mixed with 8.1 grams ammonium bicarbonate. The mixture was mixed for about 25 minutes using a mortar and pestle forming the precursor material. The precursor material was dried at 80° C. for about 6.5 hours. The dried precursor material was divided into two portions and heated at 300° C. and 400° C. for one hour in air, respectively, yielding 2 nm and 8 nm aluminum oxide, respectively. The purity of the 2 nm nanoparticles sample was determined using ICP. The aluminum oxide sample was determined to comprise less than 0.5% carbon, 2.49% hydrogen, 2.24% nitrogen, less than 27 ppm chlorine, 37 ppm lead, less than 7 ppm iron, and less than 4 ppm sulfur. Thus, the aluminum oxide was greater than 94% pure. The impurities appear to be due to water and carbon dioxide adsorbed to the surface of the nanoparticles. Such adsorbed molecules can be removed.

Example 33

20 grams cobalt nitrate hydrate were mixed with 6.2 grams ammonium bicarbonate. The mixture was mixed using a mortar and pestle for about 25 minutes forming the precursor material. The precursor material was dried at 80° C. for about 6.5 hours and then heated at 300° C. for two hours in air. The resulting product was 10 nm $Co_3O_4$.

Example 34

12.5554 grams bismuth nitrate hydrate ($Bi(NO3)3.5H2O$) were mixed with 6.0325 grams ammonium bicarbonate for about 25 minutes forming the precursor material. Bubbles formed during mixing, but no more bubbles formed after 25 minutes. The precursor material was dried overnight at 90° C. The dried precursor material was then heated at 300° C. for one hour, yielding 10 nm bismuth oxide ($Bi_2O_3$).

Example 35

3.9765 grams of $FeCl_2$ was mixed with 3.9567 grams of ammonium bicarbonate in a mortar. 5 ml water was then added. The mixing was continued until bubbling stopped. The precursor material was transferred to a porcelain combustion boat and the boat was placed in a tube furnace. The tube furnace was sealed and the furnace chamber was evacuated with a pump for 2 to 3 minutes. The furnace was then backfilled with He gas. This procedure was repeated three times to remove any residual air (oxygen) in the furnace. After the third pumping, stable He gas flow was established through the tube furnace at a flow rate higher than 90 ml/min. The furnace temperature was raised from 30° C. to 90° C. at 10° C./min and was kept at this temperature for 24 hours to dry the reaction mixture. The furnace was then heated to 360° C. at 10° C./min and held at 360° C. for 1 hour. The sample was not removed from the furnace until the temperature of the furnace had cooled down to 30° C. The product was ground into a fine powder and XRD analysis showed the formation of 54 nm magnetite, a mixed oxidation state material.

Example 36

3.735 grams aluminum nitrate were mixed with 1.232 grams sodium hydroxide. The mixing proceeded for 10 min using a mortar and pestle. Next, the precursor material was dried at 80° C. for 8 hours. The dried precursor was then heated at 325° C. for two hours in air, yielding 17 nm $Al_2O_3$ and other unidentified phases.

Example 37

2.950 g cobalt nitrate were mixed with 0.9218 g lithium hydroxide. The mixing proceeded for 10 min using a mortar and pestle. Next, the precursor was dried at 80° C. for 8 hours. The dried precursor was then heated at 325° C. for two hours in air, yielding 55 nm $LiCoO_2$ and other unidentified phases.

What is claimed is:

1. A method of forming nanoparticles comprising:
providing at least one metal salt;
providing at least one base, wherein the at least one base comprises an ammonium salt;
mixing the at least one metal salt and the at least one base to form a precursor material, wherein the metal salt and base ions are not completely solvated; and
heating the precursor material to a pre-determined temperature, at a pre-determined rate, in a pre-determined atmosphere, and for a pre-determined length of time, wherein the nanoparticles have an average particle size, wherein the average particle size is between about 1 nm and about 100 nm, a size distribution, wherein the size distribution is within about 1% to about 15% of the average particle size, and a substantially pre-determined stoichiometry.

2. The method according to claim 1, wherein the nanoparticles comprise at least one compound selected from the group consisting of a metal, a metal oxide, a mixed-metal, and a mixed-metal oxide.

3. The method according to claim 2, wherein the metal of the metal salt is selected from the group consisting of alkali metals, alkali earth metals, transition metals, lanthanide series metals, actinide series metals, aluminum, gallium, indium, thallium, germanium, tin, lead, antimony, bismuth, and polonium.

4. The method according to claim 1, wherein the atmosphere is an inert atmosphere.

5. The method according to claim 1, wherein the atmosphere is a reductive atmosphere.

6. The method according to claim 1, further comprising the step of drying the precursor material at a pre-determined temperature and for a pre-determined length of time.

7. The method according to claim 1, wherein the atmosphere is an oxidative atmosphere.

8. The method according to claim 1, wherein the at least one metal salt and the at least one base are mixed in the solid state substantially free of solvent and solvent molecules.

9. The method according to claim 1, wherein the at least one base comprises ammonium carbonate, ammonium bicarbonate, ammonium sesquicarbonate, ammonium hydroxide or ammonium nitrate.

10. The method according to claim 1, wherein the step of providing at least one metal salt comprises the step of providing two or more metal salts, and wherein the molar ratio of the metals of the two or more metal salts is substantially equal to the molar ratio of the metals in the nanoparticles.

11. A method according to claim 1, wherein the at least one metal salt comprises a compound selected from the group consisting of metal chloride, metal acetate, metal oxalate, metal citrate, metal sulfate, metal nitrate and hydrates thereof.

12. A method according to claim 1, wherein water is added to the precursor mixture to facilitate mixing or to ensure reaction completion.

13. A method of forming nanoparticles comprising:
providing at least one metal salt;
providing at least one base comprising an ammonium salt;
mixing the at least one metal salt and the at least one base to form a precursor material, wherein the metal salt and base ions are not completely solvated; and
heating the precursor material, wherein the nanoparticles have an average particle size, wherein the average particles size is between about 1 nm and about 100 nm, and a size distribution, wherein the size distribution is within about 1% to about 30% of the average particle size, and wherein the heating releases gaseous by-products.

14. A method according to claim 13, wherein the at least one metal salt and the at least one base are mixed in the solid state substantially free of solvent and solvent molecules.

15. A method according to claim 13, wherein the at least one base comprises ammonium carbonate, ammonium bicarbonate, ammonium sesquicarbonate, ammonium hydroxide or ammonium nitrate.

16. A method according to claim 13, wherein the at least one base comprises ammonium bicarbonate.

17. A method according to claim 13, wherein the heating is performed in an inert atmosphere or a reductive atmosphere or an oxidative atmosphere.

18. A method according to claim 13, wherein the nanoparticles comprise at least one compound selected from the group consisting of a metal, a metal oxide, a mixed-metal, and a mixed-metal oxide.

19. A method according to claim 13, wherein the at least one metal of the at least one metal salt is selected from the group consisting of alkali metals, alkali earth metals, transition metals, lanthanide series metals, actinide series metals, aluminum, gallium, indium, thallium, germanium, tin, lead, antimony, bismuth, and polonium.

20. A method according to claim 13, wherein the at least one metal salt comprises a compound selected from the group consisting of metal chloride, metal acetate, metal oxalate, metal citrate, metal sulfate, metal nitrate and hydrates thereof.

21. A method according to claim 13, wherein the molar ratio of the metal salt to base comprises a number in a range from about 0.01 to about 5.

22. A method according to claim 13, wherein the size distribution is within about 1% to about 10% of the average particle size.

23. A method according to claim 13, wherein the step of providing a metal salt comprises the step of providing two or more metal salts, and wherein the molar ratio of the metals of the two or more metal salts is substantially equal to the molar ratio of the metals in the nanoparticles.

24. A method according to claim 13, further comprising the step of providing water prior to or during the step of mixing to facilitate mixing or to ensure reaction completion.

25. A method according to claim 13, wherein the at least one metal salt is in an anhydrous form.

26. A method according to claim 13, wherein the at least one metal salt is in a hydrated form.

27. A method according to claim 13, wherein the at least one metal salt includes a mixture of metal salts.

* * * * *

UNITED STATES PATENT AND TRADEMARK OFFICE
CERTIFICATE OF CORRECTION

PATENT NO. : 8,211,388 B2
APPLICATION NO. : 11/707840
DATED : July 3, 2012
INVENTOR(S) : Woodfield et al.

It is certified that error appears in the above-identified patent and that said Letters Patent is hereby corrected as shown below:

On Title Page 2, Item (56) Left-hand Column
Line 2, change "Dugger" to --Dugger et al.--

In the Specifications

Column 3
Line 61, change "led bismuth" to --lead bismuth--

Column 5
Line 8, change "metals salts" to --metal salts--
Line 25, after "oxylate" insert a --,--

Column 12
Line 7, change "20 gram cobalt" to --20 grams of cobalt--
Line 16, change "20 gram" to --20 grams--
Line 48, change "4.02 nickel nitrate" to --4.02 grams of nickel nitrate--
Line 59, change "dived into" to --divided into--

Column 13
Line 43, change "iron, sulfate" to --iron, or sulfate--
Line 44, change "was greater" to --were greater--
Line 54, change "pestle forming" to --pestle, forming--

Column 14
Line 1, change "was added" to --were added--
Line 2, after "minutes" insert a --,--
Line 34, change "minutes forming" to --minutes, forming--
Line 43, change "was then" to --were then--
Line 58, change "5 ml H$_2$0" to --and 5 ml H$_2$0--

Signed and Sealed this
Sixth Day of May, 2014

Michelle K. Lee
*Deputy Director of the United States Patent and Trademark Office*

CERTIFICATE OF CORRECTION (continued)
U.S. Pat. No. 8,211,388 B2

Column 15
Line 1, change "ten minutes" to --ten minutes,--
Lines 14-24, change all "gram" to --grams of--
Line 47, change "5 ml H$_2$0" to --and 5 ml of H$_2$0--
Line 49, change "ceased forming" to --ceased, forming--
Line 51, change "was" to --were--
Line 58, change "minutes forming" to --minutes, forming--

Column 16
Line 11, change "pestle forming" to --pestle, forming--
Line 21, change "pestle forming" to --pestle, forming--
Line 36, change "ceased forming" to --ceased, forming--
Line 37, change "was" to --were--
Line 56, change "pestle forming" to --pestle, forming--
Line 64, change "was" to --were--
Line 67, change "pestle forming" to --pestle, forming--

Column 17
Line 8, change "pestle forming" to --pestle, forming--
Line 27, change "minutes forming" to --minutes, forming--
Line 36, change "minutes forming" to --minutes, forming--